May 11, 1943.                H. H. WEHRINGER                2,319,024
                               HOSE COUPLING
                          Filed June 26, 1941        2 Sheets-Sheet 1

INVENTOR.
Herman H. Wehringer,
BY George D. Richards
ATTORNEY.

May 11, 1943. H. H. WEHRINGER 2,319,024
HOSE COUPLING
Filed June 26, 1941 2 Sheets-Sheet 2

INVENTOR.
Herman H. Wehringer,
BY George D. Richards
ATTORNEY.

Patented May 11, 1943

2,319,024

UNITED STATES PATENT OFFICE 2,319,024

HOSE COUPLING

Herman H. Wehringer, Montclair, N. J.

Application June 26, 1941, Serial No. 399,764

1 Claim. (Cl. 285—84)

This invention relates to improvements in hose couplings, and the invention has reference, more particularly, to hose coupling elements provided with novel means for binding hose end portions thereto.

Hose coupling elements, which comprise both male and female elements adapted to be secured to hose end portions, are generally provided with an axial anchor spile adapted to be inserted into the bore of the hose to engage the internal wall surfaces of the latter, and thereupon to have the hose body constrictively compressed in secured relation thereto by some form of externally applied clamp means. Ordinarily the external clamp means consists of a contractible split ring or clamp band, opposed ends of which terminate in radial ears adapted to be drawn together and joined by nut and bolt means or like detachable fastening devices, so as to constrict the same about the hose end portion which is engaged by the anchor spile of the coupling. This type of clamp means involves certain disadvantages, viz., the radial projection of the ears thereof often catch upon obstructions when dragging the hose about in use, which not only impedes manipulation and use of the hose, but additionally entails both risk of doing damage to the impeding obstruction as well as to the clamp band itself, which, in the latter case, may result in loosening or breaking away of the clamping means from the hose, or splitting of the hose body or otherwise producing a leaky condition of the latter which is highly undesirable.

Having these things in view, it is an object of this invention to provide a hose coupling element including a novel form of external means for cooperation with its anchor spile, whereby to constrictively bind a hose end portion thereto; said means being of an integral or one-piece construction, free from radial or other lateral protuberances, and yet being easily applicable to the hose end portion, and readily manipulatable in connection therewith for cooperatively relating the same to the anchor spile, whereby to constrictively compress the hose body into strongly secured or anchored relation to the latter.

This invention has for another object to provide a hose coupling element of the kind mentioned including an external hose binding ferrule or sleeve, preferably made of relatively soft or somewhat ductile metal, and capable of being moved over the anchor spile expanded portion of the hose end with constrictively compressing effect upon the latter, whereby to strongly bind the same in affixed relation to said anchor spile; and a further object of the invention is to provide such hose body constricting ferrule or sleeve in a tubular form of substantial length, more or less coextensive with the length of the anchor spile, and of such bore size as to be capable of being slid onto a hose end portion prior to insertion of the anchor spile thereinto, and thereafter worked onto that portion of said hose end which is somewhat expanded by the inserted anchor spile, whereby to compress such expanded end portion into conforming and interlocking relation to the contours of the latter.

A more specific object of this invention is to provide a constricting ferrule or sleeve, adapted for the purposes stated, with a non-cutting or non-scoring internally screw-threaded bore to engage the external surface of a hose end portion so as to facilitate rotative advancing movement of said ferrule or sleeve over the hose body into operative position relative to the underlying anchor spile.

Other objects of this invention, not at this time more particularly enumerated, will be understood from the following detailed description of the same.

Illustrative embodiments of this invention are shown in the accompanying drawings, in which.

Similar characters of reference are employed in the above described views, to indicate corresponding parts.

Figure 1:
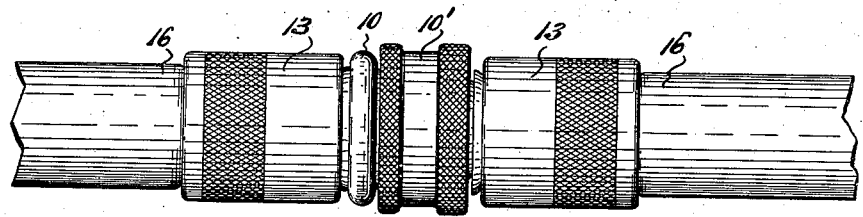
Fig. 1 is a side elevation of a hose coupling according to this invention showing connected male and female coupling elements for joining ends of hose sections together.
Figure 2:
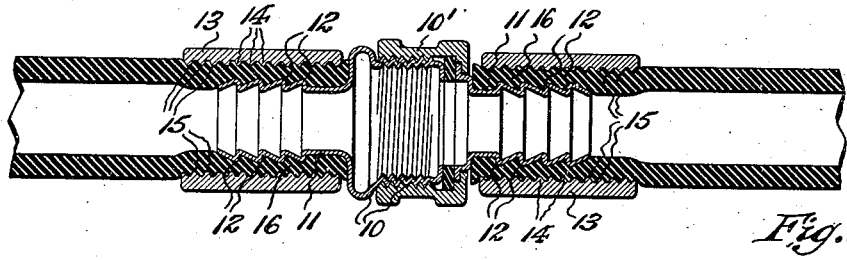
Fig. 2 is a longitudinal sectional view of the same.

The hose coupling elements according to this invention are of the type adapted for application to rubber hose or hose bodies having resilient walls. Said hose coupling elements are provided in both male and female forms, adapted to be detachably coupled together as shown in Figs. 1 and 2, wherein the male element is indicated by the reference character 10, and the female element by the reference character 10'. Each coupling element terminates at its rearward end in a tubular anchor spile 11 of reduced diameter and suitable length. Said anchor spile 11 is provided with a plurality of longitudinally spaced annular barbs 12 in the conventional manner. The female coupling element 10' is connected with its anchor spile for swiveling movement in relation thereto, also in the conventional manner.

The reference character 13 indicates an external binding ferrule or sleeve which is provided for cooperation with an anchor spile of a coupling element. This ferrule or sleeve is of cylindrical formation of a length more or less coextensive with the length of an anchor spile 11 with which it is designed to cooperate. The bore of said ferrule or sleeve 13 is of a diameter substantially corresponding to the external diameter of a hose body to be served by the coupling element. In a preferred form of said ferrule or sleeve 13, the same is provided, on the surface of its bore, with internal and comparatively coarse screw-threads 14 of suitable pitch. Said screw-threads 14 are preferably provided with rounded peripheries 15 which, while adapted to more or less indent the resilient body material of a hose to be engaged thereby, are nevertheless substantially non-cutting or non-scoring.

Figure 3:
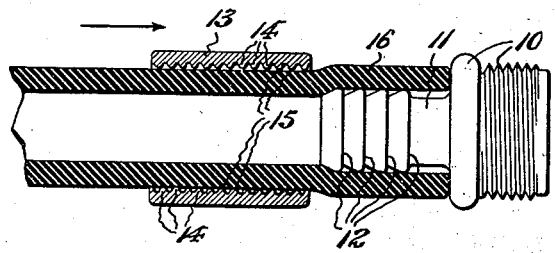
Fig. 3 is a longitudinal sectional view of a hose end portion having the external binding ferrule or sleeve engaged thereover and slid back to permit insertion of the anchor spile of a coupling element into the hose end.

To apply the coupling element to a hose end portion 16, the binding ferrule or sleeve 13 is slid over the hose end portion 16 and moved back thereon so as to leave a portion of the latter free to expand upon insertion of the anchor spile 11 of a coupling element thereinto (see Fig. 3). When the anchor spile 11 has been inserted into the hose end portion 16, the resilient walls of the latter will be somewhat expanded thereby to an external diameter somewhat in excess of the internal diameter of the threaded bore of the binding ferrule or sleeve 13 (see Fig. 3). After the parts have been thus preliminarily assembled relative to the hose end portion 16 to be served by the coupling element, the binding ferrule or sleeve 13 is moved outwardly along the hose end portion in the direction of the arrow shown in Fig. 3. In hose of comparatively small diameter, such e. g. as rubber garden hose, the binding ferrule or sleeve may be readily manipulated to this end by hand, i. e. without necessity for use of manipulating tools. As the binding ferrule or sleeve 13 is moved toward the expanded wall section of the hose end portion which overlies the inserted anchor spile 11, the screw-threads 14 of its bore will indentingly engage the external surface of said expanded wall section, with the result that a corresponding thread groove is progressively formed in the latter. Due to this action, when the binding ferrule or sleeve 13 is turned with accompanying applied forwardly thrusting pressure, it will advance over the expanded wall section of the hose end portion with constrictively compressing effect thereupon, and, consequently the resilient material of said wall section will be compressed and squeezed inwardly toward the inserted anchor spile 11, whereby to cause the internal bore surfaces of the hose end portion to conform to the contours of the anchor spile so that the annular barbs 12 thereof will be imbedded in the resilient hose wall body, thus firmly and securely interlocking the anchor spile thereto against withdrawal (see Fig. 2).

I have found it desirable to form the binding ferrule or sleeve 13 from a comparatively soft or somewhat ductile metal, such e. g. as lead, soft brass or the like. When made of such soft or somewhat ductile metal, the ferrule or sleeve 13 itself will tend to uniformly conform to the compressed and anchor spile backed hose wall with uniformly close fitting engagement therewith, thus considerably adding to the efficiency of its binding effect.

It will be observed that the binding ferrule or sleeve is free from radial or lateral projections likely to catch upon obstructions when the hose is dragged about in use, which is highly desirable for reasons already above referred to.

Figure 4:
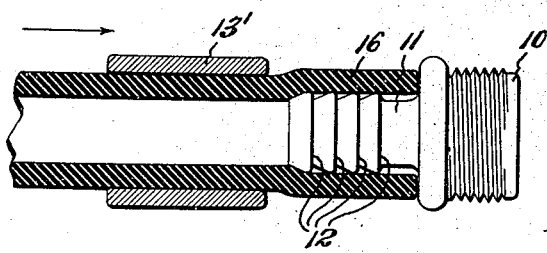
Fig. 4 is a view similar to that of Fig. 3, but showing a modified form of external binding ferrule or sleeve.
Figure 5:
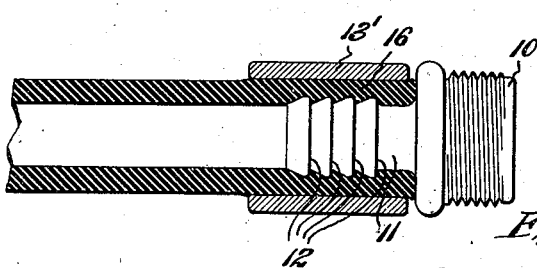
Fig. 5 is a like view showing the ferrule or sleeve moved to its operative hose securing position.

For small sizes of hose, and especially hose of highly resilient wall body, the binding ferrule or sleeve 13 may be simplified by omission of the internal screw-threads 14, leaving the bore thereof smooth surfaced. A simplified binding ferrule or sleeve of this character is shown in Figs. 4 and 5 of the drawings, being indicated by the reference character 13'. Such simplified binding ferrule or sleeve may be worked forward over the anchor spile expanded wall section of the hose, so that, when in place, the hose wall will be constrictively compressed into conforming and interlocked relation to the anchor spile, as shown in Fig. 5.

Figure 6:
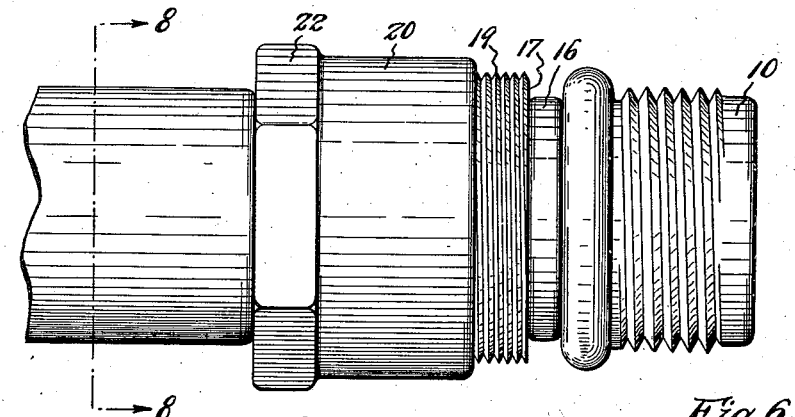
Fig. 6 is a side elevation of a hose coupling element having a modified form of external binding ferrule or sleeve means especially adapted for use with larger sizes of hose.
Figure 7:
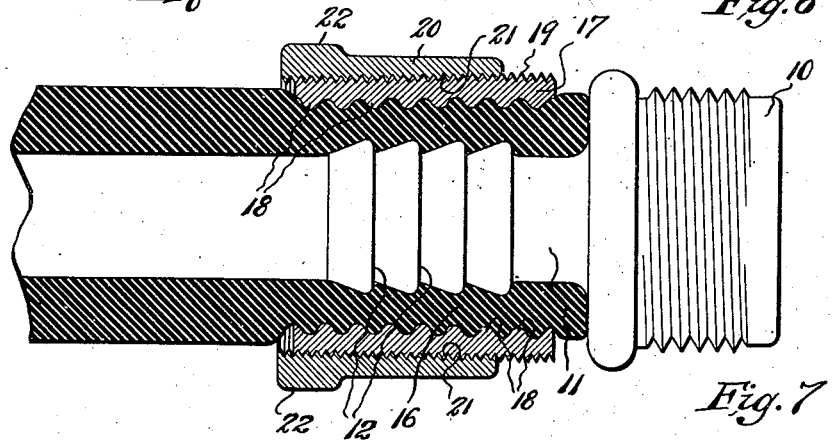
Fig. 7 is a longitudinal sectional view of the same with parts of the coupling element shown in elevation.
Figure 8:
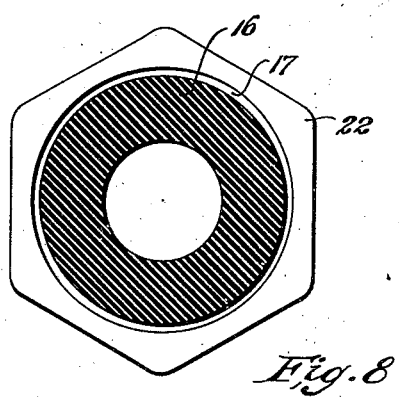
Fig. 8 is a cross sectional view, taken on line 8—8 in Fig. 6.

In the provision of hose coupling elements for hose of comparatively large diameter, such as used largely for various services in industrial plants, I have provided a somewhat modified form of binding ferrule or sleeve including a cooperating compression collar or ring. This is shown in Figs. 6 to 8 inclusive. In said Figs. 6 to 8 inclusive, the reference character 10 indicates a coupling element having an anchor spile 11 provided with the annular barbs 12, said anchor spile being inserted in the hose end portion 16, all in the manner already above described. The reference character 17 indicates a binding ferrule or sleeve made of relatively soft or somewhat ductile metal, the same having the internal peripherally rounded screw-threads 18 to facilitate advance thereof over the expanded anchor spile backed wall section of said hose end portion 16. The binding ferrule or sleeve 17 is provided with external screw-threads 19. Cooperative with said binding ferrule or sleeve 17 is a compression collar or ring 20. This compression collar or ring 20 is provided with an internally screw-threaded tapered bore 21, diminishing in diameter from its forward end toward its rearward end. When the binding ferrule or sleeve has been advanced to operative position over the anchor spile backed wall section of the hose end portion 16, the compression collar or ring 20 is engaged with the rearward end of the ferrule or sleeve 17 and thereupon screwed forwardly thereon. Owing to the action of the tapered threaded bore with which said collar or ring 20 is provided, as the latter is advanced it exerts an inwardly compressive force upon the ferrule or sleeve, which, since said ferrule or sleeve is made of relatively soft or somewhat ductile metal, operates to contract the same with strong constrictively compressing effect upon the anchor spile backed wall section of the hose end portion, whereby said wall section is forced to conform to the contours of the anchor spile so that the annular barbs 12 of the latter will imbed themselves in said wall section to thereby securely interlock the anchor spile therewith against withdrawal. If desired, said compression collar or ring 20 has its external surface suitably formed to receive application of a wrench or other suitable manipulating tool, e. g. by means of a nut flange portion 22 as shown, or in any other suitable manner.

Having now described my invention, I claim:

In a hose coupling including a coupling element having an anchor spile adapted to be inserted with expanding effect into an end portion of a resilient hose body, a cylindrical binding sleeve of soft ductile metal, such as lead, having an internally coarsely threaded bore, the threads of which have rounded non-scoring peripheries, the threaded bore of said binding sleeve substantially corresponding in diameter to the normal diameter of said hose body, said binding sleeve being adapted to be externally engaged over said hose body subject to advanced movement over and around the anchor spile backed and expanded wall section of said hose body, said binding sleeve being also externally screw-threaded by relatively fine threads, and a compression collar of rigid non-ductile characteristics, said collar having a tapered bore, said bore being internally screw-threaded from end to end, whereby said collar may be screwed onto said binding sleeve with compressive contracting effect upon the latter so as to constrictively compress said hose wall section into conforming interlocked relation to said anchor spile.

HERMAN H. WEHRINGER.